United States Patent
Sira et al.

(10) Patent No.: US 10,151,198 B2
(45) Date of Patent: Dec. 11, 2018

(54) TRACER BASED FLOW MEASUREMENT

(71) Applicant: Institutt for Energiteknikk, Kjeller (NO)

(72) Inventors: Terje Sira, Skedsmokorset (NO); Tor Bjørnstad, Hagan (NO)

(73) Assignee: RESMAN AS, Ranheim (NO)

( * ) Notice: Subject to any disclaimer, the term of this patent is extended or adjusted under 35 U.S.C. 154(b) by 62 days.

(21) Appl. No.: 14/384,161

(22) PCT Filed: Mar. 15, 2013

(86) PCT No.: PCT/EP2013/055355
§ 371 (c)(1),
(2) Date: Sep. 10, 2014

(87) PCT Pub. No.: WO2013/135861
PCT Pub. Date: Sep. 19, 2013

(65) Prior Publication Data
US 2016/0010454 A1    Jan. 14, 2016

(30) Foreign Application Priority Data

Mar. 15, 2012  (GB) .................................. 1204549.8
Mar. 15, 2012  (NO) .................................. 20120319

(51) Int. Cl.
*E21B 49/08*    (2006.01)
*E21B 47/10*    (2012.01)
(Continued)

(52) U.S. Cl.
CPC ............ *E21B 49/087* (2013.01); *E21B 27/02* (2013.01); *E21B 47/1015* (2013.01); *G01F 1/704* (2013.01)

(58) Field of Classification Search
CPC .... E21B 49/005; E21B 27/02; E21B 47/1025; G01F 1/7048; G01F 1/704; G01F 1/708; G01M 3/202; G01M 3/20; G01M 3/226
(Continued)

(56) References Cited

U.S. PATENT DOCUMENTS 3,727,048 A * 4/1973 Haas .................. G01N 33/0011
                                                    250/302
4,421,166 A    12/1983 Cain
(Continued)

FOREIGN PATENT DOCUMENTS

EP       0816631 A2    1/1998
EP       1277051 A1    1/2003
(Continued)

*Primary Examiner* — Hezron E Williams
*Assistant Examiner* — Truong D Phan
(74) *Attorney, Agent, or Firm* — Eversheds Sutherland (US) LLP

(57) ABSTRACT

An apparatus for tracer based flow measurement may include a tracer chamber for installation in and/or on a production tubing, wherein the tracer chamber is for holding tracer and is arranged to be linked, in use, to the pressure in an annulus about the production tubing. The tracer chamber may include an outlet for fluid communication between the tracer chamber and the fluid within the production tubing, whereby tracer is released from the tracer chamber into the production tubing in accordance with a pressure differential between the annulus and the production tubing.

12 Claims, 10 Drawing Sheets

(51) Int. Cl.
*E21B 27/02* (2006.01)
*G01F 1/704* (2006.01)

(58) Field of Classification Search
USPC ..... 73/1.24, 170.04, 861.95, 861.05, 861.07, 73/40.7; 166/252.6, 250.12, 278, 205
See application file for complete search history.

(56) References Cited

U.S. PATENT DOCUMENTS

| | | | | |
|---|---|---|---|---|
| 4,949,742 | A * | 8/1990 | Rando | F16K 13/10 137/13 |
| 5,052,426 | A * | 10/1991 | Kasper | B01J 3/002 137/14 |
| 5,340,272 | A * | 8/1994 | Fehlau | F04D 1/06 277/408 |
| 6,349,766 | B1 | 2/2002 | Bussear et al. | |
| 6,394,051 | B1 * | 5/2002 | Filipe | F01L 13/065 123/90.1 |
| 6,799,634 | B2 | 10/2004 | Hartog et al. | |
| 2002/0145123 | A1 * | 10/2002 | Kah, Jr. | F16K 1/10 251/30.01 |
| 2003/0056952 | A1 | 3/2003 | Stegemeier et al. | |
| 2003/0131991 | A1 | 7/2003 | Hartog et al. | |
| 2009/0250059 | A1 * | 10/2009 | Allum | A61M 16/0051 128/204.26 |
| 2011/0024111 | A1 | 2/2011 | Moen et al. | |
| 2011/0277544 | A1 | 11/2011 | Rytlewski et al. | |

FOREIGN PATENT DOCUMENTS

| | | |
|---|---|---|
| WO | 01/92685 A1 | 12/2001 |
| WO | 2009/088292 A1 | 7/2009 |
| WO | 2011/005988 A1 | 1/2011 |
| WO | 2011/153635 A1 | 12/2011 |
| WO | 2012/057634 A1 | 5/2012 |
| WO | 2013/158682 A2 | 10/2013 |

\* cited by examiner

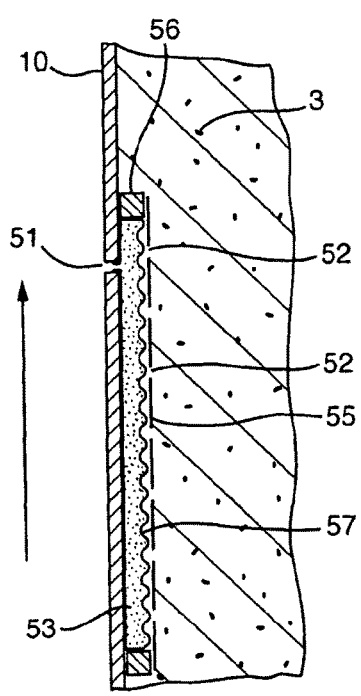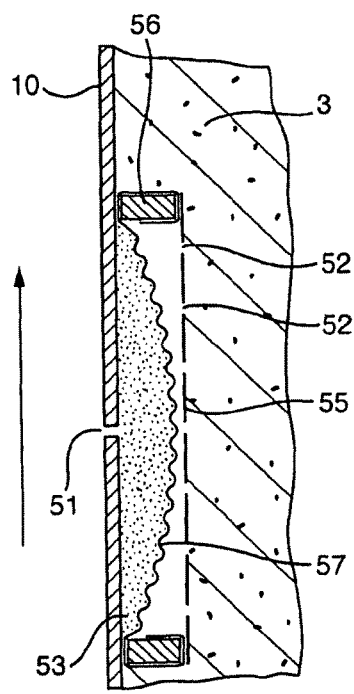

TRACER BASED FLOW MEASUREMENT

TECHNICAL FIELD

The invention relates to an apparatus for tracer based flow measurement for a production well, and to a corresponding method.

BACKGROUND OF THE INVENTION

Measurement of volumetric flow from various production zones into an oil production well is of considerable interest to well and production engineers in order to optimize the oil production and minimize the production of "unnecessary" water.

A lot of the oil on the Norwegian continental shelf, and also elsewhere in the world, is produced by well completions including flow control systems which characteristics depend on the pressure differential between the formation—or the annulus—and the production tubing, such as the so-called ICDs (Inflow Control Devices).

The production or exploration tubing is positioned in the well surrounded by the annulus. A sand screen is placed between the production tubing and the annulus. When ICDs are used, the annulus is isolated in production zones by means of packers between the production tubing and the reservoir. In each production zone, one or more ICDs are placed where the reservoir fluid flows into the production tubing. Possible flow control systems include Inflow Control Devices typically incorporating inlet opening(s), a pressure drop step, and opening(s) towards the pipe. An example is the Halliburton™ Equiflow™, focussed on reducing heel-toe effects or effects of permeability differences. Another example is the ICD described by Statoil in WO 2009/088292, designed to be selective on the fluid allowed in the pipe, and including a valve with an internal self-adjusting movable body. Flow control systems can be integrated to a sliding sleeve device which additional function is upon actuation to open/close/choke production zone or to control communication between the tubing and the annulus. A sliding sleeve device is thus incorporated in the definition of flow control system. Omega Completion Technology Ltd has such a sliding sleeve on sale. Most, if not all, inlet flow control devices have well defined flow characteristics as a function of pressure differential between the annulus and the tubing $Q=f(\Delta P)$ such that one may calculate flow if knowing pressure differential and vice-versa.

In any production well, irrespective of the flow control system that is used, it is desirable to measure the production characteristics from each production zone. Various prior art methods exist for measurement of production characteristics.

EP 0816631 discloses the use of radioactive or DNA tracers. These tracers are impregnated on the production zone tubing external coating or packed into small bags glued on perforating charges and inserted in the production formation upon perforation. Different tracers are used for different production zones or regions to enable data for different zones or regions to be isolated and analysed. The tracers are released into the well in quantity increasing with the production flow, but not proportional to the flow, and certain assumptions are required to calculate flow volumes. Release of tracer from a coating will depend on local turbulence and the composition of the fluid flowing from the reservoir, and as only a limited amount of usable tracer can be stored in the coating, operation of this solution will be limited in time before replacement of the pipe is required. Release of tracer from the bags issued from perforation will depend on the homogeneity of their distribution, the rocks characteristics in the close vicinity of the perforation, local turbulences, and fluid composition variations. As a consequence this technique does not provide accurate results.

EP 1277051 discloses a method of monitoring hydrocarbon and water production and detection of phenomena including local variations in pH, salinity, hydrocarbon composition, temperature, pressure and so on. The disclosed technique uses specific tracers immobilised by means of a polymer capable of adhering to the formation. The release of the tracer into the production flow is once again dependent on flow conditions and fluid composition, and will vary in an unpredictable fashion. The lack of proportionality of tracer release and inaccuracy of calculations based on the weakening of ionic or covalent bonds between the tracer and the polymer or between the polymer and the formation is such that accurate flow volume measurements are not possible.

U.S. Pat. No. 6,799,634 describes flow monitoring within a pipe using tracer release as a function of the flow. The tracer reservoir installed beside a venturi is activated by the pressure difference between the inlet and the constriction of the venturi. The tracer is released based on a dynamic pressure differential inside the production tubing, and the volume flow rate inside the production tubing may here be determined, by analysing the quantity of tracer downstream.

SUMMARY OF THE INVENTION

Viewed from a first aspect, the present invention provides an apparatus for tracer-based flow measurement, the apparatus comprising: a tracer chamber for installation in and/or on a production tubing, wherein the tracer chamber is for holding tracer and is arranged to be linked, in use, to the pressure in an annulus about the production tubing; the tracer chamber comprising an outlet for fluid communication between the tracer chamber and the fluid within the production tubing; whereby tracer is released from the tracer chamber into the production tubing in accordance with a pressure differential between the annulus and the production tubing.

With this arrangement the tracer release rate is accurately controlled in relation to the differential pressure between the annulus and the tubing and is in principle in proportion with this differential pressure. This allows for accurate calculations of the volume inflow rate at the position where the tracer is released. This is in contrast to the prior art described above where an accurate volumetric inflow rate measurement is not possible. In preferred embodiments where different tracers are released in different production zones or regions along a wellbore, accurate flow rates can be determined for each zone or region. The use of a chamber as described above can allow for a long operation time without the need to refill or replace the tracer load, and it can be used for most types of tracers in a solution, including oil tracers, water tracers and so on.

The link between the tracer chamber and the annulus pressure should be such that changes in the annulus pressure would be reflected by a corresponding change in the pressure in the tracer chamber. This may be as an equivalent change in pressure, or alternatively it may be as a change in pressure that can be determined in a known way, for example by a linear mathematical relationship such as a direct proportionality. It is preferred for the pressure in the tracer chamber to have a known and calculable relationship with the pressure in the annulus. The tracer release rate preferably depends solely on the pressure differential between the annulus and the tubing and is unaffected by variations in annulus fluid composition. This means that, advantageously, changes in the annulus fluid composition at the point where the annulus fluid contacts the tracer chamber do not affect the tracer release rate. This can be ensured by indirect transfer of pressure without transfer of annulus fluid into the tracer chamber.

The tracer chamber is preferably arranged for a direct link between the pressure in the annulus and the pressure of the tracer. Thus, the tracer chamber may comprise an open connection to the annulus to permit a direct contact of the annulus fluid with the tracer, or alternatively the apparatus may comprise a pressure transfer device for conveying the pressure of the annulus fluid to the tracer. In preferred embodiments there is no transfer of annulus fluid into the production tubing via the tracer chamber. Hence, with these arrangements the tracer is not carried into the production tubing by the annulus fluid but instead is merely propelled by the differential pressure, thus ensuring that the tracer release rate is related to the pressure differential as described above.

The pressure transfer device may comprise a movable part that can be pressed against the tracer by the annulus fluid pressure, for example one or more of a membrane, sliding piston or bellows, or other movable surface such as a flap device, whereby the annulus pressure may be transmitted to the tracer within the tracer chamber by movement of the movable part. The use of a movable part also has the advantage that even when the amount of tracer within the tracer chamber is depleted the relationship between annulus pressure and tracer pressure is maintained, since the movable part will allow the effective chamber volume to decrease to match the amount of tracer remaining. The pressure transfer device may include one or more intermediate hydraulic or mechanical parts between the annulus fluid pressure and the tracer chamber, such as a mechanical linkage, hydraulic chamber or similar.

Preferably, the pressure transfer device comprises a first surface in contact with fluid from the annulus to thereby permit second surface of the pressure transfer device, which is connected to the first surface, to transmit the pressure to the tracer. The first and second surfaces could be, for example, two surfaces of a membrane or two ends of a piston. The apparatus may include a housing about the tracer chamber to contain a pressure transfer device such as a membrane or piston or bellows, with openings to permit fluid from the annulus to come into contact with the first surface of the pressure transfer device. The housing can protect the moving parts during installation and also during use in the annulus/tubing.

In some preferred embodiments the tracer chamber is arranged for installation within the tubing, with an opening through the tubing permitting connection with the annulus pressure. Alternatively, the tracer chamber can be arranged for installation outside of the tubing, in the annulus, in which case the opening between the chamber and the fluid in the tubing passes from the chamber in the annulus and through the tubing to connect to the fluid therein.

The outlet of the tracer chamber may open directly into the production tubing. In this case the tracer is released directly into the production fluid and does not pass through any other medium. For example, the tracer preferably does not pass through the annulus fluid.

Preferably, the opening for fluid communication between the tracer chamber and the tubing includes a flow restrictor. The flow restrictor serves to slow down depletion of the tracer, and controls the release of the tracer. The flow restrictor may be set to allow tracer release at a rate of 0.1 to 100 mL/cP per bar per day, preferably 1 to 10 mL/cP per bar per day. The flow restrictor may for example be a capillary tube device, or a flow path obstructed by a porous material to slow the flow. An advantage of a capillary tube compared to a porous material is that the diameter of the opening can be increased compared to the size of the pores in the porous material whilst still providing the same restriction in flow by increasing the length of the tube. A capillary tube can therefore be less prone to blockage from particles in the tracer fluid and hence is preferred for some applications. A capillary tube and porous material may also be combined. For example, the entrance to the capillary tube may be filled with a porous filter with a relatively large surface with hole diameters smaller than the internal diameter of the capillary tube.

A non-return device such as a check valve may be present at the tubing side of the opening for fluid communication between the tracer chamber and the tubing. This can prevent undesired reverse flow should there be a negative pressure differential between the tubing and tracer chamber. An open/close valve may also be considered, but will require either local actuation thanks to wireline or other downhole intervention means, or distant actuation requiring some sort of hydraulic, electrical or other transmission means. In an alternative arrangement a buffer filled with tracer is provided between the flow restrictor and the outlet into the production tubing in order to provide a buffer preventing tubing fluid from entering the tracer chamber during reverse flow. Such a buffer can prevent the tubing fluid fouling the flow restrictor for the tracer.

In preferred embodiments a membrane is used as the moveable part. The membrane may comprise a metal or polymeric material. A housing including a perforated plate may enclose the membrane. This can protect the membrane whilst exposing it to the annulus pressure.

Preferably, the membrane is a cylindrical membrane and the perforated plate is a cylindrical plate. In this way the tracer chamber may be formed as an annular volume inside, or preferably outside the tubing. The membrane and perforated plate may be arranged to extend between two flanges of a tubing section. The plate and/or membrane can advantageously be connected to the tubing section to thereby form the housing and tracer chamber, with an opening through the tubing forming the opening for fluid connection between the tracer chamber and the fluid in the tubing.

In preferred embodiments the apparatus includes the tracer chamber and optionally other preferable features when installed in production tubing. Thus, the invention extends to production tubing comprising an apparatus as described above.

The apparatus may include a tracer measurement device for measurement of tracer concentrations downstream of the tracer chamber. The measured tracer concentrations may advantageously be used to determine production volumes, preferably in accordance with calculations discussed herein in relation to the preferred embodiments. The apparatus may comprise a calculation device for calculation of production flow, for example a computer device or the like.

Viewed from a second aspect, the invention provides a method of tracer based flow measurement comprising: releasing tracer into a production tubing in accordance with a pressure differential between an annulus and the production tubing.

The method may include the use of a tracer chamber for installation in and/or on the production tubing, wherein the tracer chamber is for holding tracer and is arranged to be linked to the pressure in the annulus about the production tubing; the tracer chamber comprising an outlet for fluid communication between the tracer chamber and the fluid within the production tubing; whereby tracer is released from the tracer chamber into the production tubing in accordance with a pressure differential between the annulus and the production tubing.

The method may include the use or provision of an apparatus with any or all features as set out above in relation to the preferred and optional features of the first aspect. The method may include restricting the flow of tracer from the tracer chamber into the tubing, for example by means of a flow restrictor device as discussed above.

The method may include measurement of tracer concentration downstream of the tracer chamber, for example at a topside location. The measured tracer concentrations may advantageously be used to determine production volumes, and hence the method may comprise determining production flow volumes based on measured tracer concentrations and on known characteristics of the tracer release and production control. Preferably the production volumes are determined in accordance with calculations as discussed herein in relation to the preferred embodiments.

As used herein, the term production tubing is intended to cover a strictly speaking production tubing as well as exploration tubing, test tubing and any other functionally equivalent arrangements. The term tubing shall be interpreted broadly to cover a piping string, or coiled tubing, or other means of canalising the flow from downhole sources. The term tracer chamber is intended to cover all limited volume containers—or reservoirs—where the tracer compound may be contained, with or without other compounds, in different phases (solid, liquid, gas), and/or at different concentrations. The tracer chamber may take any suitable form. For example, it may be any form of container or reservoir capable of being connected via an outlet to the production tubing and able to be influenced by the pressure differential between the annulus and the production tubing. Various examples are described herein, and the tracer chamber may also take other forms.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

Certain preferred embodiments will now be described by way of example only and with reference to the accompanying drawings in which:

FIGS. 8a and 8b show alternative embodiments of tracer release devices using membrane arrangements similar to those of FIG. 4;

DETAILED DESCRIPTION

Figure 1:
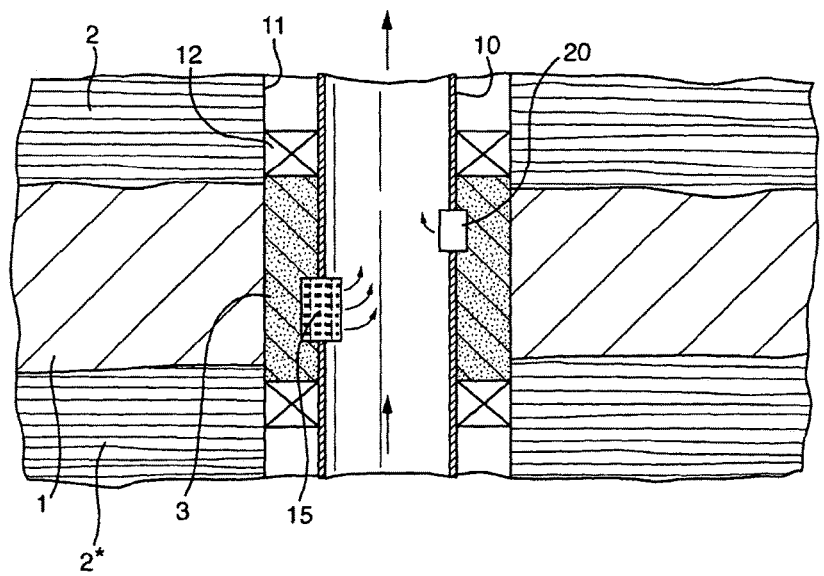
FIG. 1 shows a tracer release device used in an example hydrocarbon production zone that features an Inlet Control Device (ICD)

The general principle of the invention is illustrated in FIG. 1, which shows a tracer release device including tracer chamber 20 in a geological formation made of a hydrocarbon production zone 1 (for example, sandstone, carbonates and so on) framed by impermeable layers 2, 2* (for example, shales, salts and the like). A tubing 10 has been installed in the formation, and it is separated from the geological rocks by a sand filled annulus 3 and optionally by a casing 11 (or a natural clean cut borehole, possibly with a mud cake layer). At the level of the annulus 3, the production zone is typically isolated from geological formation above and below by packers 12. Production is controlled at the level of an ICD (Inflow Control Device) 15 or multiple such devices as known in the industry, although it should be understood that the advantages arising from the tracer device 20 are not limited to use with ICDs but also apply for other flow control devices. An arrow within the tubing 10 indicates the typical direction for the production flow, towards the topside or wellhead. For the purposes of the examples shown in FIGS. 1 to 5 the vertical direction for the tubing 10 will be kept as constant orientation for ease of reference and understanding. The axis of the tubing 10 need not be vertical though. It can be horizontal, or even with an inverted slope.

The tracer release device has as a main part thereof a tracer chamber 20 that holds the tracer. The device also includes further additional features, which may be as described below with reference to FIGS. 2 to 5, being provided in order to release the tracer from the chamber 20 into the tubing 10 at a rate that is accurately linked to the differential pressure between the pressure in the annulus 3 and the pressure in the tubing 10.

The tracer chamber 20 is linked to the tubing 10 by a flow restrictor, which operates to allow the release of the tracer at a rate that is related to the pressure in the tracer chamber 20 in a predetermined way. The flow restrictor can be designed as known in the industry, for example a threaded plug with small diameter opening which fits into a standard threaded port in the tube wall, in the same way as a nozzle in a rudimentary ICD, or a porous plug, for instance filled up with sintered material, or a very thin tube (capillary tube) which is wound up inside the plug. Example flow restrictors are described below with reference to FIGS. 6 and 11.

The flow restrictor thus acts to allow the release of tracer from the chamber 20 in a manner that is related to the difference in pressure between the chamber 20 and the tubing 10. Since the relationship is predetermined, it is possible to calculate the chamber pressure 20 based on the amount of tracer that is found at some location downstream of the location of the tracer release device. This is discussed in more detail below.

A check valve or any appropriate one-way flow controller can optionally be present in order to prevent a reverse flow where fluid from the tubing 10 passes back through the flow resistance element into the tracer chamber 20. This could happen if the pressure differential becomes negative. A negative pressure differential may happen during tube laying operation, testing, or during shut down of the well. Prevention of reverse flow into the tracer chamber 20 will prevent clogging the flow opening, prevent dilution of the tracer preparation in the tracer chamber, and also prevent scaling. These issues arising from reverse flow could induce an error in the calculation formula (1) discussed below.

Note that an open/close valve may also be added, together with or instead of a check-valve. However, actuation means, whether downhole or distant will introduce additional challenges on installation, operation, and maintenance.

The tracer chamber 20 is subjected to a pressure that is equivalent to or at least directly and possibly linearly related to the pressure of the fluids of the annulus 3. This means that the rate of tracer release through the flow restrictor is then related via the pressure in the tracer chamber 20 to the pressure in the annulus 3. Thus, the tracer in the tracer chamber 20 is exposed to the annulus pressure by a suitable mechanism, examples being discussed below.

The chamber 20 contains tracer compounds with a known concentration. For a given differential pressure $\Delta p$ between the annulus 3 and the inside of the production tubing, the rate of flow of tracer $F_{trac}$ from the tracer reservoir can be described as:

$$F_{trac} = \frac{kc_{trac}}{\mu}\Delta p \tag{1}$$

Here, k is a constant related to the characteristics of the flow resistance element representing the inverse of the flow resistance, $c_{trac}$ is the known tracer concentration in the tracer reservoir and $\mu$ is the known viscosity of the tracer liquid at the prevailing temperature. The tracer flow, $F_{trac}$ (amount of tracer/time unit) is thus proportional to the differential pressure between the tubing 10 and annulus 3, and the proportionality constant can easily be determined.

k, $c_{trac}$, $\mu$ and $\Delta p$ may each cover a certain range of values, depending on the well conditions, the ICD, the nature and concentration of the tracing compound. The commonly preferred ranges are as follows:

k is typically in the range of 0.1 to 100 mLcP per bar per day, preferably 1 to 10 mL/cP per bar per day $c_{trac}$ is typically in the range of 5 to 100%, preferably >50% (percentage of tracer dissolved in solvent), and most preferably 100% (pure liquid tracer).

$\mu$ is typically in the range of 1 to 100 cP $\Delta p$ is typically in the range of 1 to 30 bars, preferably 2 to 10 bars, and most preferably 2 to 5 bars Calculations made in cases described below show that the tracer release device can work without requiring a tracer refill or tracer reservoir replacement for several years.

When the tracer liquid flows into the production tubing, it will be dissolved in the appropriate phase in the well fluid (in water for a water tracer, in oil for an oil tracer, in oil and water for an oil/water partitioning tracer and in gas and oil for a gas/oil partitioning tracer) and be diluted to a lower concentration as it moves towards the topside and flow from other producing zones above are collected in the production tubing. The same amount of tracer which enters the production tubing from the tracer reservoir will exit the production tubing topside (tracers are selected so that there is no tracer degradation of the tracer or sorption to the tubing wall during transport). Let the volumetric flow topside be $V_{top}$ (production flow) and let the tracer concentration in the fluid topside be $c_{top}$. Then, we have:

$$V_{top}c_{top} = F_{trac} = \frac{kc_{trac}}{\mu}\Delta p \text{ or}$$

$$\Delta p = \frac{V_{top}c_{top}\mu}{kc_{trac}}$$

One observes that k, $c_{trac}$ and $\mu$ are known. The production $V_{top}$ is also known. The tracer concentration $c_{top}$ may be determined by collecting fluid samples followed by tracer analysis in the laboratory, or by having an online analyser. Thus, $\Delta p$ can be calculated accurately.

Knowing $\Delta p$ and the flow resistance characteristics of the ICD or equivalent production flow restriction element, the production flow entering the tube at the production zone where the tracer release device is installed can be calculated, By using different tracers for the different production zones or regions in the well, the pressure differential $\Delta p$ for each zone or region can be determined, and thus production flow for each producing zone can be calculated.

Note that the analysis of tracers need not be performed topside, or at the exit of the well. This analysis can be performed in the well, downstream of the tracer chamber, or it may be performed on a plant downstream of the wellhead, for example on a platform or on-shore plant serving a subsea well-head.

Various designs for the tracer release device are disclosed herein. One common requirement is that the tracer chamber be submitted to the same pressure as the annulus 3, or at least at a pressure which is unequivocally related to the annulus pressure (for example with a constant or predictable pressure difference). The importance of this is that it is necessary for the chamber 20 to have a pressure with a known and calculable relationship to the pressure in the annulus 3, since this then permits the tracer release rate to be accurately linked to the pressure differential between tubing 10 and annulus 3 in a known way. This permits the production flow rate at the reservoir zone with the tracer release site to be determined accurately, which provides significant benefits.

Figure 2A:
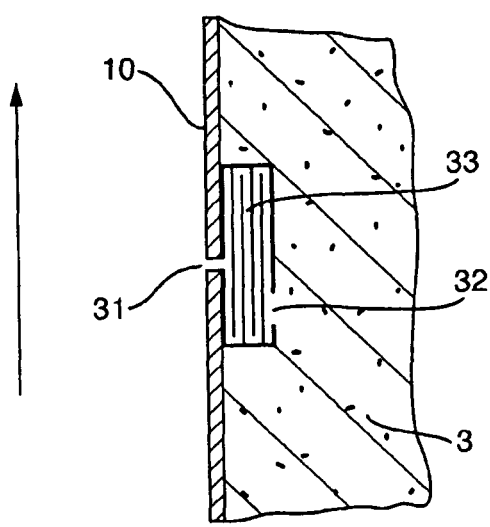
FIGS. 2a and 2b illustrate saturation tracer release devices internal and external of the tubing.
Figure 2B:
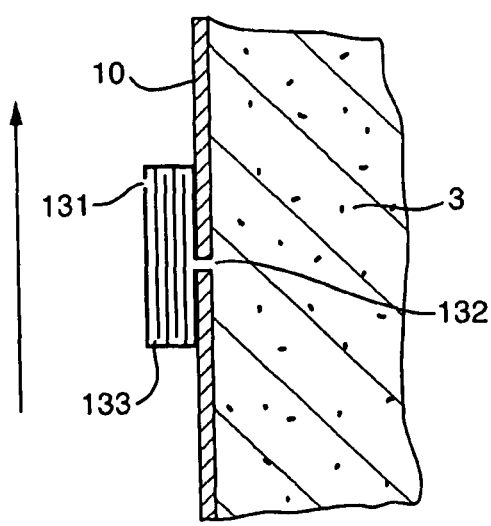

One arrangement, as shown in FIGS. 2a and 2b, includes a tracer chamber 33, 133 with a given volume which is open towards the annulus 3. The tracer may be a solid, either in the form of a slightly soluble salt or as a solid dispersed in a polymeric or ceramic matrix. The tracer may also be a viscous fluid, such as a gel. When the fluid from the annulus 3 enters the tracer chamber 33, 133 (with a low flow rate) then the tracer will be dissolved into this fluid. With the preferred embodiments this forms a saturated solution that fills the tracer chamber. Due to a higher flow resistance in the opening 31,131 from the chamber 33, 133 to the tubing than in the opening 32, 132 from the annulus 3 to the tracer chamber 33, 133, the tracer concentration in the fluid will be at a known saturation concentration. This known concentration is then released into the production tubing at a rate related directly to the pressure differential between the tubing and the annulus. This is to be contrasted with prior art tracer release devices where a solid tracer is dissolved into and entrained with annulus fluid passing by a body of the solid tracer. In this prior art situation the tracer release rate varies in an unpredictable way with variations in the composition and flow rate of the annulus fluid, amongst other things, and the desired relationship between tracer release rate and annulus pressure is not attained.

Against the production tubing and at the level of a port in the tubing 10, the tracer chamber 33, 133 is installed, with one or several opening(s) 32,132 towards the annulus 3 and one or several opening(s) 31,131 towards the tubing. Whereas the chamber 33 is external to the tubing in FIG. 2*a*, FIG. 2*b* shows an alternative in which the chamber 133 is internal to the tubing 10 in FIG. 2*b*. The one or several opening(s) 31,131 towards the tubing 10 present a higher resistance to flow than the one or several opening(s) 32,132 towards the annulus 3, thus ensuring a minimum retention time inside the chamber 33, 133 and allowing saturation of the solution with the tracer compound. Additional features to control the retention time may be added, such as baffles to direct the solution flow. Various additives, such as anti-scaling compounds, may be added in order to make operations of the chamber more robust. There is a risk of scaling occurring within the chamber 33, 133 (possibly resulting from the combination of temperature, pressure, characteristics of the tracer compound in its storage form and characteristics of the carrying solution flowing in from the annulus 3, typically the production fluid), or at the outlet to the tubing 10 (possibly due to interaction with the fluid flowing within the tubing 10). A filter may be added at the inlet opening (s) 32,132 in order to avoid clogging within the chamber in case of, for example, a high particle load. In order to avoid scaling at the chamber outlet port, a non-return device such as a check-valve may be added. An alternative solution is to use a buffer at the outlet to the tubing 10 as described below with reference to FIG. 12, for example.

The external chamber 33 or internal chamber 133 can be concentric with the tubing 10, or not. In order to avoid unusual installation challenges, the thickness of the tracer chamber 33 when installed external to the tubing 10 should not exceed a few centimeters, for example less than two centimeters. The required volume may be obtained by calculating the desired length of the tracer chamber, see example calculations below. When installed within the tubing 10, the tracer chamber 133 will require less attention during installation in the well as the external diameter will be the one of standard tubing, but it will provide less volume per meter tubing, and may require extra attention during later operations in the well.

Figure 3A:
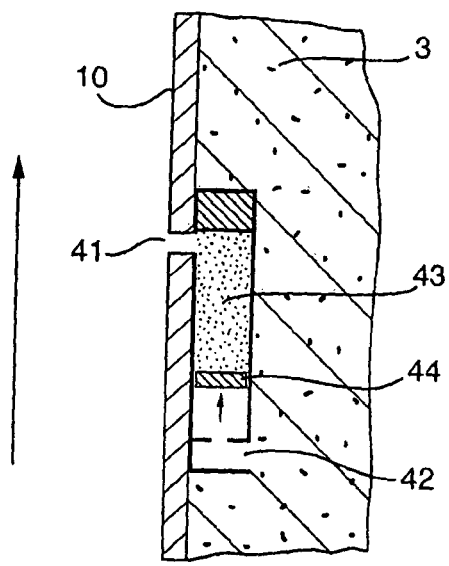
FIGS. 3a and 3b show alternative tracer release devices internal and external of the tubing, these tracer release devices using a piston arrangement.
Figure 3B:
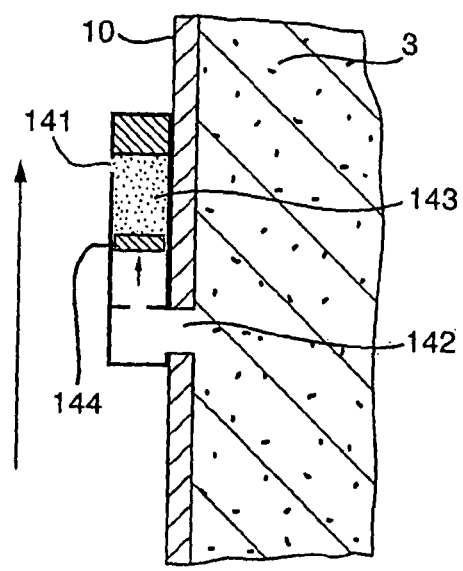

Another arrangement for a tracer release device is illustrated in FIGS. 3*a* and 3*b*. In this arrangement the tracer is not in contact with the fluid from the annulus 3. Instead there is a tracer chamber with a movable piston 44, 144 where one end is in pressure equilibrium with the annulus 3, and the piston communicates the annulus pressure at the other end to the tracer chamber where the tracer is slowly pushed into the production tubing 10. This tracer chamber 43, 143 may be filled with a liquid or gel tracer or a tracer solution of known concentration.

Against the production tubing 10 and at the level of a port in the tubing 10, the tracer chamber 43, 143 is installed, with one or several opening(s) 42,142 towards the annulus 3 and one or several opening(s) 41,141 towards the tubing 10. The chamber 43 is external to the tubing 10 in FIG. 3*a* and in the alternative arrangement of FIG. 3*b* the chamber 143 is internal to the tubing 10. A filter may be added at the inlet opening (s) 42,142. In order to ensure a stable translation of the piston 44, 144, the one or several opening(s) 41,141 towards the tubing 10 present a high resistance to flow. Various additives, such as anti-scaling compounds, may be added to the tracer(s). Scaling may risk occurring at the outlet to the tubing 10, possibly due to interaction with the fluid flowing within the tubing 10. In order to avoid scaling at the chamber outlet port, a non-return device such as a check-valve may also be added. An alternative is a self-cleaning device based on preferential local fluid streams or any other known device design.

The position and shape of the chamber can be optimised, as discussed above for FIGS. 2*a* and 2*b*.

Figure 4A:
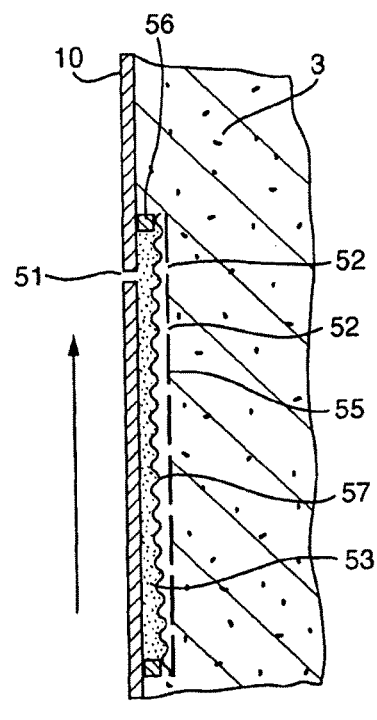
FIGS. 4a and 4b show further alternative tracer release devices internal and external of the tubing, these tracer release devices using a membrane arrangement.
Figure 4B:
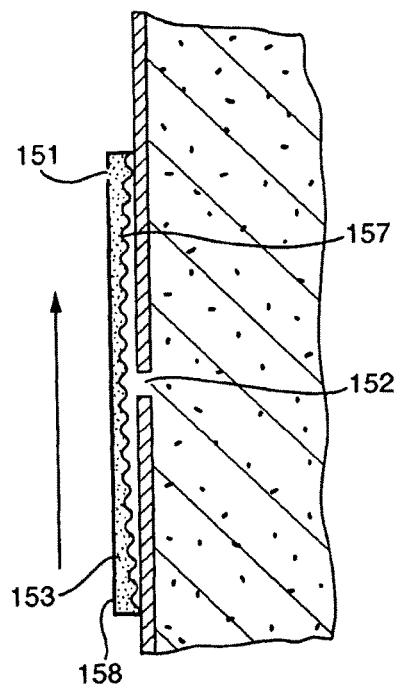

Still another solution where the tracer is not in communication with the annulus fluids involves a flexible membrane as shown in FIGS. 4*a* and 4*b*. The annulus pressure is applied to a membrane 57, 157 enclosing the tracer volume, externally or internally. Once again the tracer is not in direct contact with the annulus fluid but the pressure differential can be used to control the release of the tracer.

The tracer chamber 53, 153 is installed against the production tubing 10 and at the level of a port in the tubing 10 with one or several opening(s) 52,152 towards the annulus 3 and one or several opening(s) 51,151 towards the tubing 10. The chamber 53 is external to the tubing 10 in FIG. 4*a*, whereas in FIG. 4*b* the chamber 153 is internal to the tubing 10. A filter may be added at the inlet opening (s) 52,152. In order to ensure a controlled operation of the tracer injection and the deformation of the membrane 57, 157, the one or several opening(s) 51,151 towards the tubing 10 present a high resistance to flow. Discussions on additives, anti-scaling design, position and shape of the chamber, can be found for embodiments described above.

In the case of external installation, as shown in FIG. 4*a*, the membrane 57 has to be mechanically protected from the annulus material by an outer steel plate or cylinder 55. One solution is to abut the cylinder 55 on flanges 56 (for example connecting flanges). The height of these flanges 56 will typically be around 1 cm, and for the purpose of robustness and easiness during operations of the tubing 10, we may design the tracer chamber 53 around the tubing 10 with a maximal thickness of 1 cm. The length of the chamber 53 may then be chosen to be the distance between the flanges (which is the length of the tubing section). Thus, the volume of injectable tracer will simply be proportional to the length of tube section retained. The steel cylinder 55 must have perforations 52 so that the outside of the membrane 57 (and thereby also the inside) is in pressure equilibrium with the annulus 3.

The membrane 57, 157 may typically be made of metal, such as lead, gold, silver, or aluminium, as discussed in EP403603. Copper may possibly also be used. It may deform plastically (soft metal such as lead), or it may deform at least partially elastically, for example by the use of a thin flexible metal sheet or a corrugated metal sheet. The membrane may also be made of a polymeric material, such as Kapton® polyimide. The membrane should remain sealed against diffusion of tracer or formation fluid. Resistance to downhole corrosiveness is also an important parameter in the selection of material.

Since the flow resistance in the ICD nozzles is known, production flow is directly related to and can be determined by the differential pressure between the annulus 3 and the inner production tubing 10. The devices and methods described herein provide a fully passive and accurate measurement of the differential pressure by means of tracer technology. No external energy supply or signal cables are required for the downhole installation since the measurement signal (the tracer) is transported with the fluid flow to a topside collection or analysis point where the mentioned differential pressure may be calculated from the tracer concentration in the produced fluid.

Figure 5:
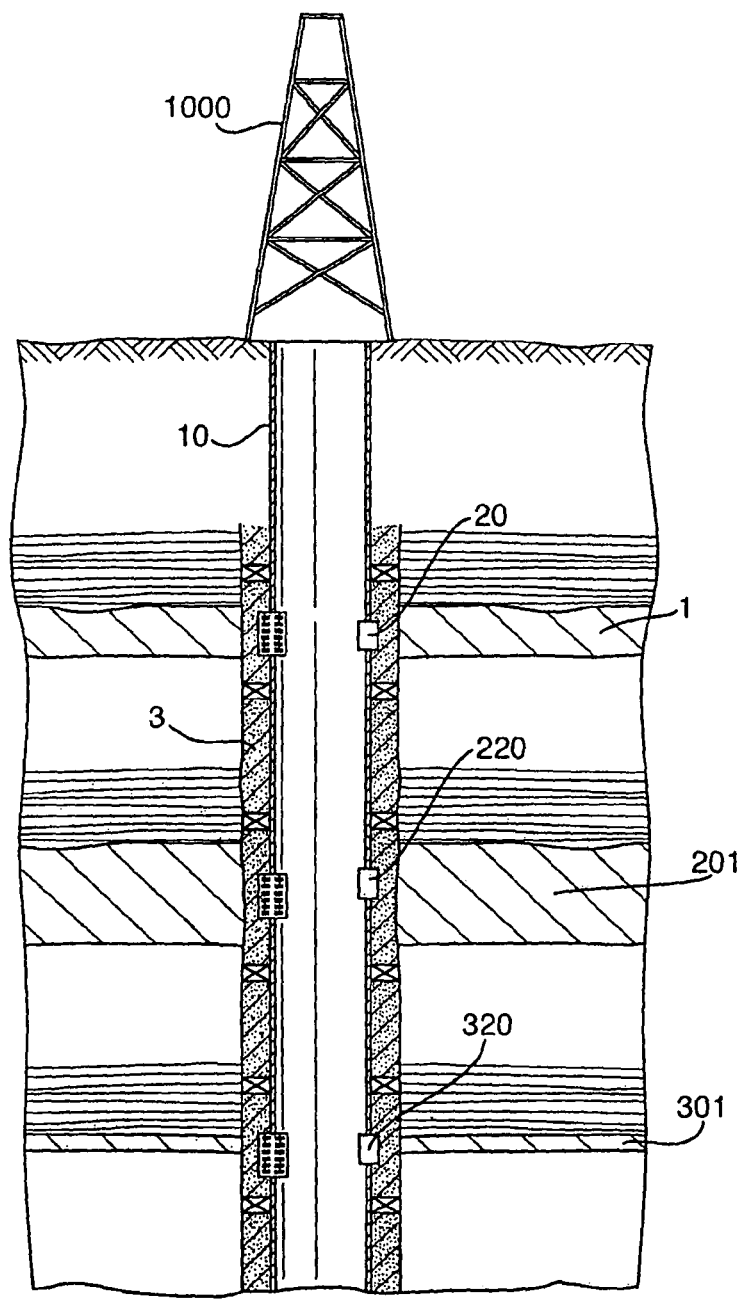
FIG. 5 illustrates a wellbore with several production zones.

These techniques can be readily applied to a production well with several production zones 1, 201, 301 as illustrated in FIG. 5. By providing each production zone 1, 201, 301 with a tracer release device and selecting a different tracer for each production zone, a complete picture of the flows of multiple zones can be obtained. This can also be expanded to any set of zones or regions in a well, and by the use of appropriately selected tracers the production flow for different components (oil, water) can be determined.

Figure 6:
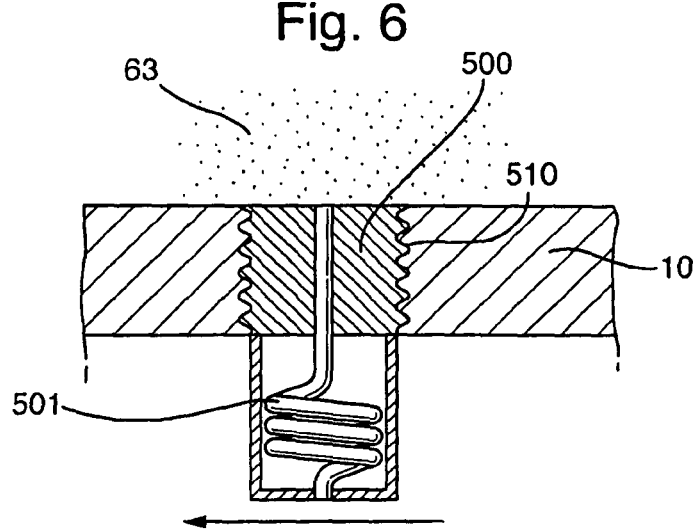
FIG. 6 shows the principles of flow resistance device based on a capillary tube

FIG. 6 shows an example of a flow resistance device that can be used in the tracer release devices described herein at the outlets 31, 131, 41, 141, 51, 151 from the chambers 33, 133, 43, 143, 53, 153 into the tubing 10. This example is of the capillary tube type. The tracer chamber (represented by its tracer content 63) connects to the tubing 10 thanks to a flow restriction plug 500 traversing the tubing 10 at a screwed port 510, and contains a capillary tube 501 which characteristics (internal opening and length) is designed to obtain the desired flow resistance characteristics.

As an example consider a tracer fluid with a viscosity of 50 cP. The volume flow should be proportional to pressure and is decided to be at 1 mL/day for a pressure differential of 5 bar. A 1 m capillary tube 501 is used as the flow resistance, wound up inside the plug 500. The required inner diameter of the tube 501 would then be 25-30 microns. In practice one would probably use standard diameter capillary tubes and then use the required length in order to get the required volume flow.

Figure 7:
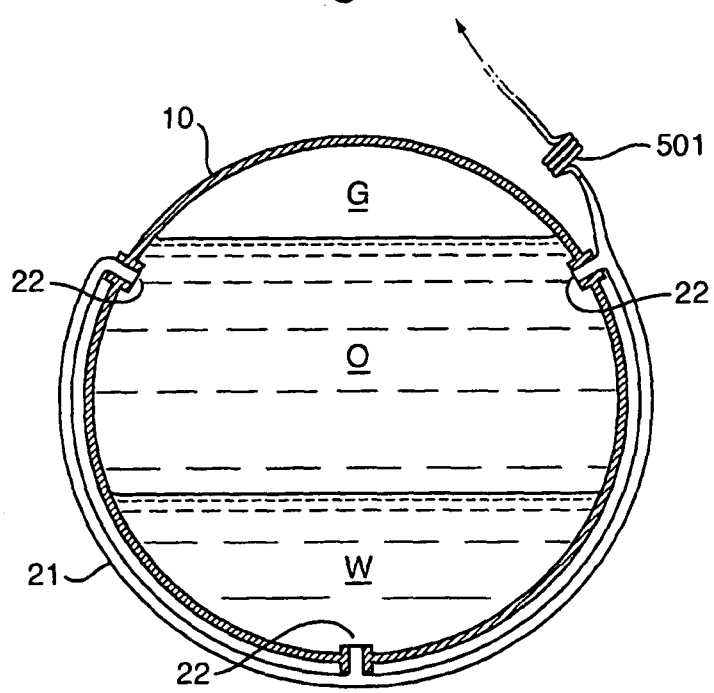
FIG. 7 is a diagram of a system for distribution of tracer through multiple inlets about the tubing.

FIG. 7 is a diagram of a system for delivering tracer at multiple points about the circumference of the production tubing 10. The purpose of this system is to ensure effective delivery of tracer into a separated fluid within the production tubing 10. The production fluid can separate easily when the tubing 10 is not vertical, with water W at lower parts of the tubing 10, oil O above the water, and gas G above the oil as shown. The tracer delivery system of FIG. 7 comprises a flow restrictor (in this example a capillary tube 501) connected to a tracer reservoir upstream, which may be any of the exemplary reservoirs described herein. Tracer is provided from the reservoir through the capillary tube 501 in accordance with the pressure differential between the production tubing 10 and the annulus and this is passed to a distribution system 21 downstream of the capillary tube 501. The distribution system has a network of outlets opening into the tubing 10. These outlets 22 and the interconnecting fluid passageways have low head losses and the tracer fluid released into the distribution system 21 hence flows freely into the production fluid from any of the multiple outlets 22. This reduces the risk of inhibition of tracer uptake by the production fluid when the tracer is exposed to a phase that it does not readily mix with, for example a water based tracer and a heavy oil phase in the production tubing.

Further examples of tracer delivery systems are shown in FIGS. 8*a* and 8*b*. These are shown as alternatives to the system of FIG. 4*a*, with the tracer chamber 53 outside of the production tubing 10, but it will be understood that they could equally well be implemented as alternatives to FIG. 4*b*, with the tracer chamber within the tubing 10. The tracer chamber 53 is installed up against the production tubing 10 and at the level of a port in the tubing 10 with several openings 52 towards the annulus and an opening 51 towards the tubing 10. A filter may be added at the inlet openings 52. In order to ensure a controlled operation of the tracer injection and the deformation of the membrane 57 the opening 51 presents a high resistance to flow. The device of FIG. 8*a* differs from that of FIG. 4*a* in that the membrane 57 forms an enclosed reservoir opening only at the outlet 51. This minimises the risk of leakage, for example at the flanges 56. The device of FIG. 8*b* differs from that of FIG. 4*a* in that the membrane 57 is connected to the flanges 56 at the side adjacent to the tubing rather than at the outer edge. This has the advantage that the reservoir 53 formed by the membrane can be completely emptied during the release of the tracer from the chamber 53. Discussions on additives, anti-scaling design, position and shape of the chamber, can be found for embodiments described above.

Figure 9A:
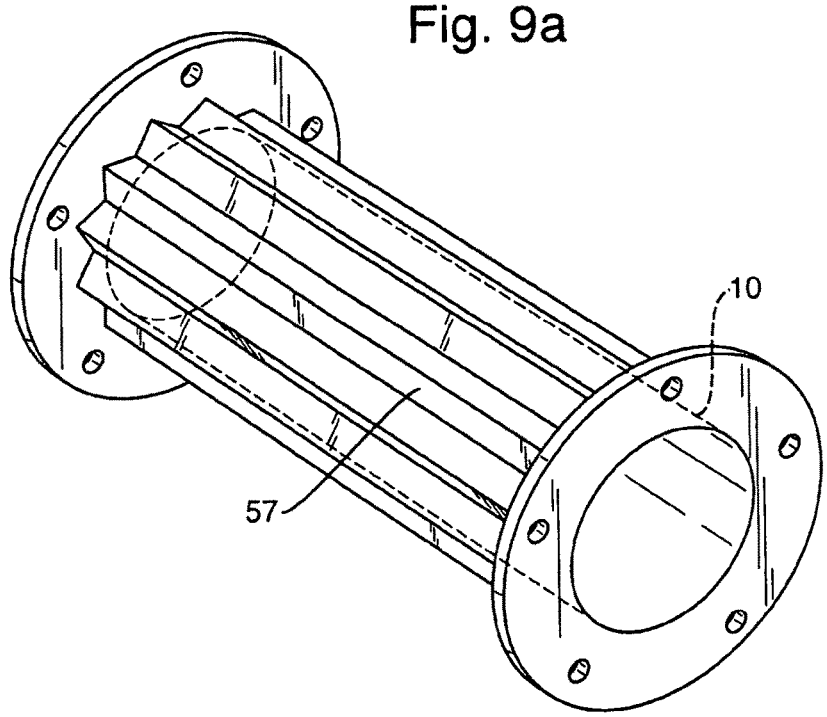
FIGS. 9a and 9b show possible corrugated membrane configurations.
Figure 9B:
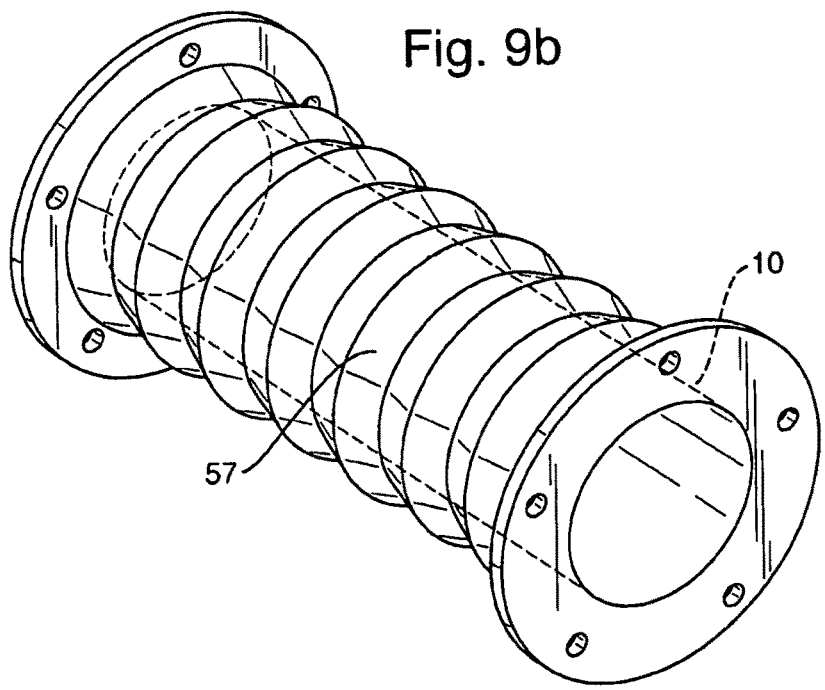

As discussed above, the membrane 57 can be formed as a cylinder enclosing an annular reservoir about the production tubing 10. In that case the membrane 57 may be formed with a corrugated surface to permit easier deflection of the membrane. FIGS. 9*a* and 9*b* show alternative arrangements for these corrugations, which may be either along the cylinder or around its circumference.

Figure 10A:
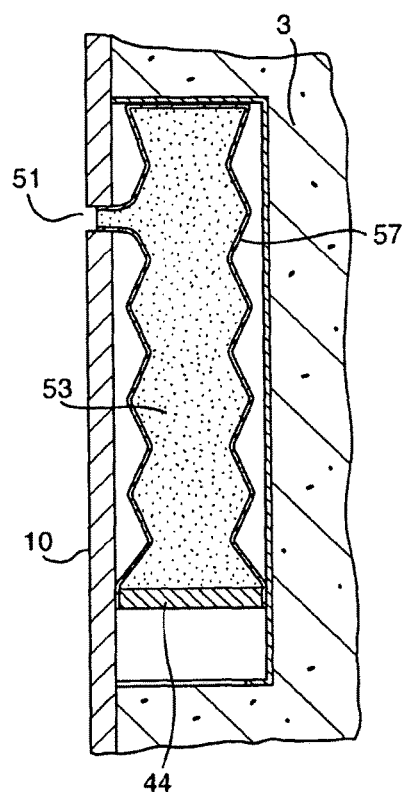
FIGS. 10a and 10b illustrate further alternative embodiments utilising a combination of a membrane and piston(s)
Figure 10B:
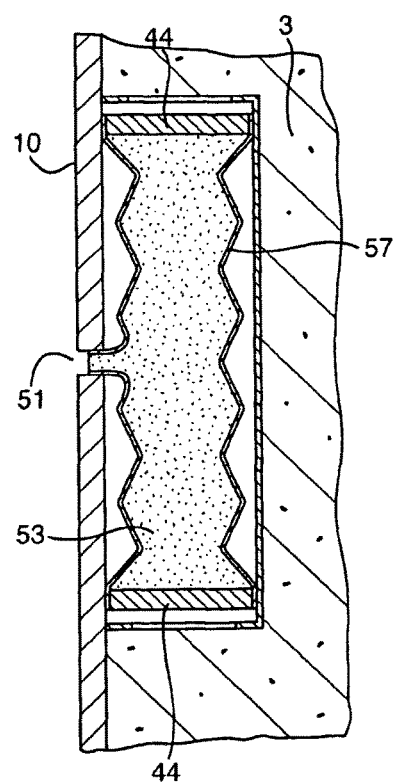

The membrane 57 and piston 54 features described above can be combined, for example as shown in FIGS. 10*a* and 10*b*. FIG. 10*a* shows a single piston 44 attached to a membrane 57 that forms and enclosure for the tracer chamber 53. The pressure of the annulus fluid on the piston 44 will push tracer out of the outlet 51 through the tubing 10. The outlet 51 has a high resistance to flow as described above. FIG. 10*b* shows an alternative using two pistons 44. By enclosing the tracer chamber 53 with a membrane 57 as well as using a piston the risk of leakage about the piston is avoided. Also the membrane 57 is not directly exposed to the annulus fluid and therefore the risk of damage to the membrane 57 is reduced.

Figure 11:
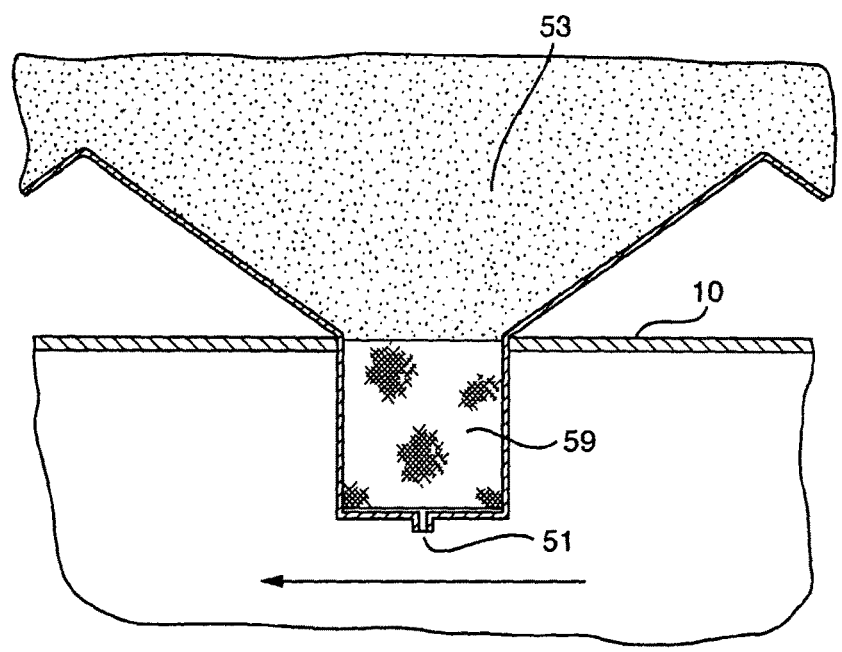
FIG. 11 shows an alternative flow resistance device using a porous body.

As noted above a body of porous material can be used as an alternative to the capillary tube of FIG. 6. FIG. 11 shows an example of this. The tracer reservoir 53 in this example is outside of the production tubing 10 and being acted on by the annulus pressure, for example by use of a membrane and/or piston as described above. Tracer is released via an outlet 51 into the production tubing flow. The flow resistance at the outlet 51 is provided by a body of porous material 59. The material has open pores to permit flow of the tracer. Forcing the tracer through the pores creates a high flow resistance.

Figure 12:
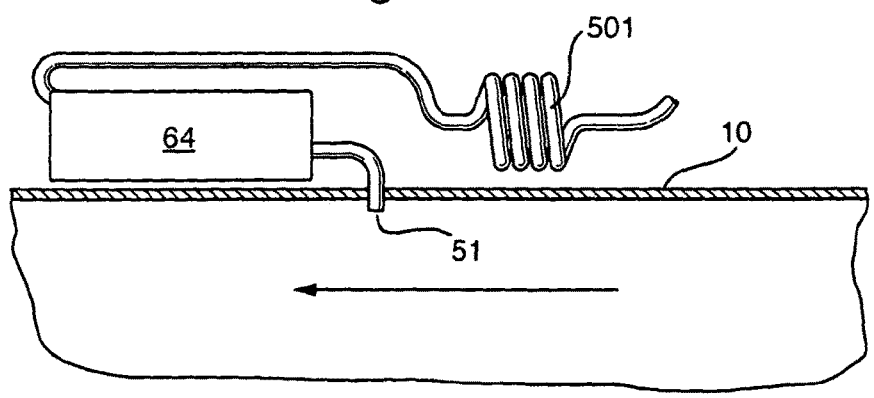
FIG. 12 illustrates a system for buffering reverse flow of fluid from the tubing into the tracer delivery device.

A possible problem can occur with reverse flow of the production fluid into the outlet 51 of the tracer delivery system. This can be solved by a check-valve as described above, but this may not be desirable for all installations. FIG. 12 shows an alternative arrangement using a buffer 64 between the outlet 51 into the production fluid and the flow restriction device, which in this example is a capillary tube 501. The tracer flows from the reservoir (which could for example be any of the tracer chambers described above) through the flow restrictor and the buffer 64 into the production tubing 10. Once the buffer 64 has been primed then the release rate of tracer will be proportional to the pressure differential as required above. If, however, there is a reverse flow then the production fluid cannot easily reach the flow restrictor since it must first either fill the buffer 64, or chase the tracer which has been filling the buffer 64, either during installation (a negative pressure differential can be a common installation characteristic) or after some production (and then, the tracer has filled the buffer 64 anyway). This means that damage to the flow restrictor or contamination of the tracer reservoir can be avoided during reverse flow, without the need to use a check-valve or similar mechanism.

In the text below, a number of examples are given of various tracer types and the calculated tracer concentration topside for typical parameter values.

Calculations for Various Tracer Components

In all calculations of tracer concentrations in the text below, a length of 200 cm is considered for length of the tracer chamber, which is an annular shape around the tubing 10 and is of the membrane type as shown in FIG. 4a. On the outside of the flanges is the membrane 57, in the form of a tube or a cylinder. The volume between the membrane 57 and the outer wall of the production tubing 10 forms the tracer chamber 53.

The differential pressure over the ICD and the flow resistance in the nozzle from the tracer production must be matched so as to obtain a tracer flow in the order of 1-5 mL/d. This results in a very low tracer concentration in the fluid topside. Thus, a requirement is that the tracer must be measurable at these low concentrations.

A. Tracers for the Aqueous Phase—Aqueous Tracer Solution

Definition of some parameters used in the calculations below:

Let $c_{trac}$ be the tracer concentration in g/mL in the aqueous tracer solution Let the leak rate of tracer, for a defined pressure over the ICD, be denoted $F_{trac}$ (mL/d)

Let the total volume flow in the production well be $V_{top}$ mL/d

Let the tracer concentration in the produced water be $c_{top}$ g/mL

Suppose the water cut $w_c$ %

Suppose a tracer cylindrical annular volume around the production tubing 10 with the outer radius=$r_1$=7 inch=8.96 cm and the inner radius=$r_2$=7.96 cm. The length of the annular cylinder is set to L=200 cm.

The annular volume is given by $$V_A = 4\pi L(r_1^2 - r_2^2)$$
$$= 3.1415 \cdot 200 \cdot (8.96^2 - 7.96^2)$$
$$= 10630 \text{ mL}.$$

Tracer Volume Duration—Example AV.1:

For a constant leak rate of $F_{trac}$=1 mL/d (=365 mL/y): Duration of the defined tracer volume is:

$$T_{trac} = V_A/(F_{trac} \cdot 365)$$
$$= 10630/(1 \cdot 365)$$
$$= 29.1 y$$

Tracer Volume Duration—Example AV.2:

For a leak rate of 5 mL/d: Duration of the defined tracer volume is:

$$T_{Trac} = 10630/(5 \cdot 365)$$
$$= 5.8 y$$

Tracer Concentrations—Example AC.1:

Suppose $c_{trac}$=0.1 g/mL. The tracer concentration in the produced water is derived from the formula:

$$(c_{top})_w = c_{trac} \cdot F_{trac} \cdot 100/(V_{top} \cdot w_c)$$

For realistic parameter values like:

$$c_{trac} = 0.1 \text{ g/mL} \approx 10^5 \text{ ppm}$$
$$F_{trac} = 1 \text{ mL/d}$$
$$V_{top} = 1.59 \cdot 10^9 \text{ mL/d}( = 10.000 \text{ bbls/d})$$
$$w_c = 50\%$$
$$(c_{top})_w = 0.1 \cdot 1 \cdot 100/(1.59 \cdot 10^9 \cdot 50)$$
$$= 1.26 \cdot 10^{-10} \text{ g/mL}$$
$$\approx 126 \text{ ppt constant concentration for 29 years}$$

For most of the available water tracers one operates with a detection limit in produced waters of about 50 ppt, in the average, by using upconcentration, derivatization and GC/MS-MS analysis. For several of the tracers detection limits are down towards 5 ppt and some fluorescent tracers are even below 1 ppt by the use of enrichment followed by HPLC with fluorescence detector. Hence, the calculated concentration of 126 ppt is easily detected with an uncertainty in the order of 10-15%.

Tracer Concentrations—Example AC.2:

Many production wells experience a higher water cut. In this case the tracer will be more diluted. As an example the following parameters are supposed:

$$c_{trac} = 0.1 \text{ g/mL} \approx 10^5 \text{ ppm}$$
$$F_{trac} = 5 \text{ mL/d}$$
$$V_{top} = 1.59 \cdot 10^9 \text{ mL/d}( = 10.000 \text{ bbls/d})$$
$$w_c = 90\%$$
$$(c_{top})_w = 0.1 \cdot 5 \cdot 100/(1.59 \cdot 10^9 \cdot 90)$$
$$= 3.49 \cdot 10^{-10} \text{ g/mL}$$
$$\approx 349 \text{ ppt constant concentration for 5.8 years}$$

Tracer Concentrations—Example AC.3:

For commingled production from several individual sidewells the total volumetric flow rate in the connecting vertical well might be considerably higher than the rate used in the former examples. Here, we consider the volumetric flow rate increased by a factor of 10:

$$c_{trac} = 0.1 \text{ g/mL} \approx 10^5 \text{ ppm}$$
$$F_{trac} = 5 \text{ mL/d}$$
$$V_{top} = 1.59 \cdot 10^{10} \text{ mL/d}( = 10.000 \text{ bbls/d})$$
$$w_c = 50\%$$
$$(c_{top})_w = 0.1 \cdot 5 \cdot 100/(1.59 \cdot 10^{10} \cdot 50)$$
$$= 6.3 \cdot 10^{-11} \text{ g/mL}$$
$$\approx 63 \text{ ppt constant concentration for 5.8 years}$$

This concentration is well within the tracer-analytical capacity with existing methods and equipment.

Examples of useful tracers for these measurements are polyhalogenated benzoic acids (like 2,3,4,5-fluorobenzoic acid) and various naphtalenesulfonic acids (like 1,5-naphtalenedisulfonic acid), but the invention is not restricted to these compounds.

B. Tracers for the Aqueous Phase—100% Concentrated Tracer Liquid

In this case the tracer volume is composed of either
 a. a tracer liquid at STP with a low vapour pressure even at well temperatures (70-100° C.), or
 b. a solid material at STP (which makes it easier to handle during installation) but which melts to a non-viscous fluid at well temperatures.

In both cases, the mass of tracers in 1 mL diffusing out of the narrow orifice is determined by the density of the tracer material. For several actual tracer compounds the density is around 1.5 g/mL.

Examples of useful tracers for these measurements are perdeuterated light alcohols (like $CD_3OH$) and perdeuterated light ketones (like $CD_3(CO)CD_3$), but the invention is not restricted to these compounds.

Tracer Concentrations—Example BC.1:
In this case the following formula is used:

$$(c_{top})_w = \rho_{trac} \cdot F_{trac} \cdot 100/(V_{top} \cdot w_c)$$

For $$\rho_{trac} = 1.5 \text{ g/mL}$$
$$F_{trac} = 1 \text{ mL/d}$$
$$V_{top} = 1.59 \cdot 10^9 \text{ mL/d}(= 10.000 \text{ bbls/d})$$
$$w_c = 50\%$$
$$(c_{top})_w = 1.5 \cdot 1 \cdot 100/(1.59 \cdot 10^9 \cdot 50)$$
$$= 1.89 \cdot 10^{-9} \text{ g/mL}$$
$$\approx 1.9 \text{ ppb}$$
$$= 1900 \text{ ppt constant concentration for 29 years}$$

This concentration level makes it possible to analyze the tracer samples at the well site and one may even, after some fluid preparation (removal of organic components), perform on-line analysis for tracers with fluorescence properties.

C. Tracers for the Organic Phase—Solid Tracer Dissolved in Organic Solvent

This example is very similar to those given under section A above. The calculation formula is the same except that the parameter $w_c$ must be substituted with the oil cut, $o_c$.

However, if the purpose is to measure differential pressure-promoted volumetric flow through a nozzle with say, $w_c$=50%, the use of an oil tracer is not the first choice, the reason being that these samples are more difficult and time-consuming to analyze. However, if the oil is the continuous phase in the well, oil tracers may still be preferred.

Examples of useful tracers for these measurements are heavy polyhalogenated and polyaromatic carboxylic acids, but the invention is not restricted to these compounds.

D. Tracers for the Organic Phase—Pure (Solvent-Free) Organic Tracer Liquid

This example is very similar to those given under section B above. The calculation formula is the same except that the parameter $w_c$ must be substituted with the oil cut, $o_c$. Additional comments under section C is valid also here.

Examples of useful tracers for these measurements are perfluorinated and polyaromatic hydrocarbons (like perfluorodecalin), but the invention is not restricted to these compounds.

E. Tracers for the Aqueous and/or Organic Phase—Oil/Water Partitioning Tracer Dissolved in Water In an oil/water mixture where the phases are immiscible an oil/water partitioning tracer is distributed between the phases. The distribution is governed by the so-called distribution ratio (or partition coefficient), which is defined by $$D_{o/w} = [Tr]_o/[Tr]_w$$

where $[Tr]_o$ and $[Tr]_w$ denotes the total analytical concentration of the tracer component in the oil phase and the water phase, respectively, at equilibrium. For constant experimental conditions (temperature, pressure, oil composition, water composition) D is a constant, but the value is individual for each tracer component. This parameter must be taken into account in the calculation of the tracer concentration.

In addition we have that the tracer fractions in the oil and water phases sum up to a fraction=1:

$$[Tr]_o + [Tr]_w = 1$$

Solving $[Tr]_w$ from the two equations gives:

$$[Tr]_w = 1/(1 + D_{o/w})$$

Correspondingly, solving $[Tr]_o$ gives:

$$[Tr]_o = D_{o/w}/(D_{o/w} + 1)$$

A calculation example for the case the tracer is going to be analyzed in the aqueous phase is, for instance:

$$(c_{top})_w = c_{trac} \cdot F_{trac} \cdot [Tr]_w \cdot 100/(V_{top} \cdot w_c)$$

Introducing the expression for $[Tr]_w$ gives:

$$(c_{top})_w = c_{trac} \cdot F_{trac} \cdot 100/[V_{top} \cdot w_c \cdot (1 + D_{o/w})]$$
$$c_{trac} = 0.1 \text{ g/mL} \approx 10^5 \text{ ppm}$$
$$F_{trac} = 1 \text{ mL/d}$$
$$V_{top} = 1.59 \cdot 10^9 \text{ mL/d}(= 10.000 \text{ bbls/d})$$
$$w_c = 50\%$$
$$D_{o/w} = 1$$

(i.e. equal tracer concentrations in both oil and water)

$$(c_{top})_w = 0.1 \cdot 1 \cdot 100/(1.59 \cdot 10^9 \cdot 50 \cdot 2)$$
$$= 6.29 \cdot 10^{-11} \text{ g/mL}$$
$$\approx 63 \text{ ppt constant concentration for 29 years}$$

For $D_{o/w}=2$ (i.e. the concentration of the tracer in the oil phase is the double of the concentration in the aqueous phase) and $F_{trac}=5$ mL/d, the calculation becomes:

$$(c_{top})_w = 0.1 \cdot 5 \cdot 100/(1.59 \cdot 10^9 \cdot 50 \cdot 3)$$
$$= 2.10 \cdot 10^{-10} \text{ g/mL}$$
$$\approx 210 \text{ ppt constant concentration for 5.8 years}$$

In this last example,—if one analyzes the oil phase and supposes equal analytical sensitivity and a $w_o$=50%, the result will be:

$$(c_{top})_o = c_{trac} \cdot F_{trac} \cdot [Tr]_o \cdot 100/(V_{top} \cdot w_o)$$

Introducing the expression for $[Tr]_w$ gives:

$$(c_{top})_o = c_{trac} \cdot F_{trac} \cdot D_{o/w} \cdot 100/[V_{top} \cdot w_o \cdot (1+D_{o/w})]$$

$$(c_{top})_o = 0.1 \cdot 5 \cdot 2 \cdot 100/[1.59 \cdot 10^9 \cdot 50 \cdot 3]$$

$$= 4.19 \cdot 10^{-10} \text{ g/mL}$$

$$\approx 420 \text{ ppt constant concentration for 5.8 years}$$

Examples of useful tracers for these measurements are polyhalogenated phenols (like 3,4-fluorophenol), but the invention is not restricted to these compounds.

F. Tracers for the Aqueous and/or Organic Phase—Oil/Water Partitioning Tracer as a 100% Concentrated (Solvent-Free) Liquid Calculation of the tracer concentrations in the aqueous phase, resp. the oil phase, is similar to those in section E above, but the tracer density $\rho_{Trsc}$ has to be included in the formulas instead of the tracer concentration $c_{Trac}$. For analysis of tracers in the water phase the valid formula is:

$$(c_{top})_w = \rho_{trac} \cdot F_{trac} \cdot 100/[V_{top} \cdot w_c \cdot (1+D_{o/w})]$$

For analysis of tracers in the organic phase the valid formula is:

$$(c_{top})_o = \rho_{trac} \cdot F_{trac} \cdot D_{o/w} \cdot 100/[V_{top} \cdot w_o \cdot (1+D_{o/w})]$$

Examples of useful tracers for these measurements are polyhalogenated benzene or methylsubstituted benzene (like xylene), but the invention is not restricted to these compounds.

Typically, the density of actual tracers is around 1 g/ml. In this case, and by using the same parameter values as above ($D_{o/w}=2$), $(c_{top})_w$ and $(c_{top})_o$ are calculated to be $(c_{top})_w$=2100 ppt(=2.10 ppb) constant concentration for 5.8 years and $(c_{top})_o$=4200 ppt(=4.20 ppb) constant concentration for 5.8 years G. Tracers for the Oil and Gas Phases—Oil/Gas Partitioning Gas (at Well Temperatures) Tracer as a 100% Concentrated (Solvent-Free) Liquid Examples of useful tracers for these measurements are the perfluorinated cyclic hydrocarbons (like perfluorotrimethylcyclohexane), but the invention is not restricted to these compounds.

These tracers are liquids at STP conditions but their boiling point is lower than the well temperatures. They have no solubility in the water, but partition between the oil and gas phases. Hence, in addition to the water cut $w_c$ and the gas/oil distribution ratio $D_{o/g}$, one needs the gas/oil ratio (GOR). Typically, distribution ratios are in the range $D_{o/g} \approx 3-5$ for sampling conditions at the flow-line topside or at the test separator. When analysing the tracer in the oil phase, pressurized samples have to be collected for subsequent flashing of the gas tracer under controlled laboratory conditions followed by GC/MS-MS analysis. Analytical sensitivity will, in this case, be similar to the examples given in the sections above.

CONCLUSION ON EXAMPLE CALCULATIONS

Calculated tracer concentrations in all the examples given above are well within the general analytical capability of tracer-analytical laboratory of the inventors. For some of the higher concentrations one may even consider the possibility to analyze the tracers at site or even on-line.

In all examples a tracer chamber with a length covering a tube section of 2 m and an annular thickness of 1 cm in a 7 inch tubing have been used. In case it is possible to increase the length of the tracer chamber, the duration of the leak through the tracer outlet flow restrictor increases correspondingly. One may instead choose to increase the leak rate, and thereby the tracer concentration for the same duration.

On the other hand, if the volume of the annular cylinder has to be reduced, the leak duration reduces correspondingly.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. An apparatus for tracer based flow measurement, the apparatus comprising:
   a tracer chamber for installation at a production tubing, wherein the tracer chamber is for holding tracer and is arranged to be linked, in use, to the pressure in an annulus about the production tubing;
   the tracer chamber comprising an outlet for fluid communication between the tracer chamber and the fluid within the production tubing;
   wherein the tracer chamber includes a pressure transfer device for conveying the pressure of the annulus fluid to the tracer;
   wherein the pressure transfer device comprises a movable part configured to be pressed against the tracer within the tracer chamber by the annulus fluid pressure such that the annulus pressure is transmitted to the tracer by movement of the movable part, wherein the movable part comprises a first surface in contact with the fluid from the annulus and a second surface connected to the first surface and in contact with the tracer within the tracer chamber; and
   wherein tracer is released from the outlet of the tracer chamber into the production tubing at a release rate that is in proportion with the pressure differential between the annulus and the production tubing.

2. The apparatus as claimed in claim 1, wherein pressure in the tracer chamber has a known and calculable relationship with the pressure in the annulus.

3. The apparatus as claimed in claim 1, comprising a tracer measurement device for measurement of tracer concentrations in production flow(s) downstream of the tracer chamber.

4. The apparatus comprising production tubing and an apparatus for tracer based flow measurement as claimed in claim 1 installed in the production tubing.

5. The apparatus as claimed in claim 4, comprising a calculation device for calculation of production flow based on the measured tracer concentrations.

6. The apparatus as claimed in claim 1, wherein the moveable part comprises a membrane.

7. The apparatus as claimed in claim 6, wherein the membrane is enclosed by a housing including a perforated plate for communication of the annulus fluid pressure to a surface of the membrane.

8. The apparatus as claimed in claim 7, wherein the membrane is a cylindrical membrane and the perforated plate is a cylindrical plate, with the tracer chamber formed as an annular volume.

9. A method of tracer based flow measurement comprising: releasing tracer into a production tubing in accordance with a pressure differential between an annulus and the production tubing with the use and/or provision of an apparatus of claim 1.

10. The method as claimed in claim 9, including the use of a tracer chamber for installation in and/or on the production tubing, wherein the tracer chamber is for holding tracer and is arranged to be linked to the pressure in the annulus about the production tubing; the tracer chamber comprising an outlet for fluid communication between the tracer chamber and the fluid within the production tubing; whereby tracer is released from the tracer chamber into the production tubing in accordance with a pressure differential between the annulus and the production tubing.

11. The method as claimed in claim 9, including measuring tracer concentration in production flow(s) downstream of the tracer chamber.

12. The method as claimed in claim 11, wherein the measured tracer concentrations is used to determine production volume(s).

* * * * *